United States Patent
Indo et al.

(10) Patent No.: US 9,612,154 B2
(45) Date of Patent: Apr. 4, 2017

(54) METHOD FOR DIAGNOSING OPTICAL SPECTROMETERS OF DOWNHOLE TOOLS

(71) Applicant: Schlumberger Technology Corporation, Sugar Land, TX (US)

(72) Inventors: Kentaro Indo, Sugar Land, TX (US); Alexis Petit, Dhahran (SA); Vivek Agarwal, Houston, TX (US); Sepand Ossia, Houston, TX (US); Julian J. Pop, Houston, TX (US); Kai Hsu, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/577,573

(22) Filed: Dec. 19, 2014

(65) Prior Publication Data

US 2016/0178435 A1   Jun. 23, 2016

(51) Int. Cl.
| | |
|---|---|
| G01J 3/02 | (2006.01) |
| E21B 47/01 | (2012.01) |
| E21B 49/08 | (2006.01) |
| G01V 8/02 | (2006.01) |
| E21B 49/10 | (2006.01) |

(52) U.S. Cl.
CPC ............ *G01J 3/0297* (2013.01); *E21B 47/01* (2013.01); *E21B 49/087* (2013.01); *E21B 49/10* (2013.01); *G01V 8/02* (2013.01)

(58) Field of Classification Search
CPC .................................................... G01J 3/0297
See application file for complete search history.

(56) References Cited

U.S. PATENT DOCUMENTS

| | | | |
|---|---|---|---|
| 3,848,683 A | * | 11/1974 | Persson ..................... E21B 7/20 175/171 |
| 7,336,356 B2 | | 2/2008 | Vannuffelen et al. |
| 7,379,180 B2 | | 5/2008 | Vannuffelen et al. |
| 7,886,821 B2 | | 2/2011 | DiFoggio |
| 2011/0108720 A1 | * | 5/2011 | Ford ....................... E21B 49/08 250/262 |

(Continued)

OTHER PUBLICATIONS

Aslam, et al. "On Estimating the Size and Confidence of a Statistical Audit," Proceedings of the Electronic Voting Technology Workshop (EVT '07), Boston, MA, Aug. 6, 2007, pp. 1-20.

(Continued)

*Primary Examiner* — Tarifur Chowdhury
*Assistant Examiner* — Omar Nixon
(74) *Attorney, Agent, or Firm* — Michael Dae

(57) ABSTRACT

A method for analyzing the condition of a spectrometer is provided. In one embodiment, the method includes acquiring optical data from a spectrometer of a downhole tool during flushing of a flowline and selecting a data set from the acquired optical data. The method can also include estimating light scattering and optical drift for the spectrometer based on the selected data set and determining impacts of the estimated light scattering and optical drift for the spectrometer on measurement accuracy of a characteristic of a downhole fluid determinable through analysis of the downhole fluid using the spectrometer. Additional methods, systems, and devices are also disclosed.

20 Claims, 12 Drawing Sheets

(56) References Cited

U.S. PATENT DOCUMENTS

2013/0265409 A1* 10/2013 Tjhang ............... H04N 5/23229
  348/82
2014/0150545 A1  6/2014 Hsu et al.
2015/0054512 A1* 2/2015 DiFoggio ................ E21B 49/02
  324/324

OTHER PUBLICATIONS

Breiman "Bagging predictors," Machine Learning, vol. 24, No. 2, 1996, pp. 123-140.

Efron "The 1977 Rietz Lecture—Bootstrap Methods: Another Look at the Jackknife," The Annals of Statistics, vol. 7, No. 1, 1979, pp. 1-26.

Young "Rayleigh scattering," Applied Optics, vol. 20, No. 4, Feb. 15, 1981, pp. 533-535.

Hegeman, et al. "Application of Artificial Neural Networks to Downhole Fluid Analysis," Paper IPTC 11268 PP, presented at the International Petroleum Technology Conference, Dubai, UAE, December published in SPE Res Eval & Eng 12 (1): 8-14. SPE paper 123423, pp. 8-13.

Indo, et al. "Estimation of Fluid Composition from Downhole Optical Spectrometry," SPE 166464: SPE Annual Technical Conference and Exhibition, New Orleans, Louisiana, USA, Sep. 30-Oct. 2, 2013, pp. 1-21.

Smits, et al. "In-Situ Optical Fluid Analysis as an Aid to Wireline Formation Sampling," SPE paper 26406 presented at the SPE Annual Technical Conference and Exhibition, Houston, Texas, USA, Oct. 3-6, pp. 91-98.

* cited by examiner

METHOD FOR DIAGNOSING OPTICAL SPECTROMETERS OF DOWNHOLE TOOLS

BACKGROUND

Wells are generally drilled into subsurface rocks to access fluids, such as hydrocarbons, stored in subterranean formations. The formations penetrated by a well can be evaluated for various purposes, including for identifying hydrocarbon reservoirs within the formations. During drilling operations, one or more drilling tools in a drill string may be used to test or sample the formations. Following removal of the drill string, a wireline tool may also be run into the well to test or sample the formations. These drilling tools and wireline tools, as well as other wellbore tools conveyed on coiled tubing, drill pipe, casing, or other means of conveyance, are also referred to herein as "downhole tools." Certain downhole tools may include two or more integrated collar assemblies, each for performing a separate function, and a downhole tool may be employed alone or in combination with other downhole tools in a downhole tool string.

Formation evaluation may involve drawing fluid from a formation into a downhole tool. In some instances, downhole fluid analysis is used to test the fluid while it remains in the well. Such analysis, which can be performed with sensors of downhole tools, is used to provide information on certain fluid properties in real time without the delay associated with returning fluid samples to the surface. Information obtained through downhole fluid analysis can be used as inputs to various modeling and simulation techniques to estimate the properties or behavior of fluid in a reservoir. Some downhole tools include optical spectrometers for measuring optical properties of received fluids. These optical spectrometers can include emitters and detectors of electromagnetic radiation positioned about flowlines in the tools. Optical windows can be provided in the flowlines to isolate the emitters and detectors from fluids in the flowlines, while allowing radiation to pass through the windows and the fluids.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a method includes using a spectrometer of a downhole tool to acquire optical data while flushing a flowline of the spectrometer. The method also includes selecting a data set from the optical data and estimating light scattering and optical drift for the spectrometer based on the selected data set. Further, the method includes determining impacts of the estimated light scattering and optical drift for the spectrometer on measurement accuracy of a characteristic of a downhole fluid that can be determined through analysis of the downhole fluid using the spectrometer.

In another embodiment, a method includes quantifying baseline drift of an optical spectrometer. Impact of the baseline drift on prospective measurement of a fluid property that would rely on optical spectrometer data can then be estimated. The method also includes determining whether the estimated impact of the baseline drift on the prospective measurement of the fluid property is greater than a desired threshold.

In a further embodiment, an apparatus includes a downhole sampling tool and a controller. The downhole sampling tool includes a flowline and an intake for receiving a fluid in the flowline. The sampling tool also includes a spectrometer positioned for acquiring optical data for the fluid in the flowline. The controller can be operated to assess baseline drift of the spectrometer and to estimate quantitative impact of the baseline drift on a future calculation of a fluid characteristic based on optical data from the spectrometer.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

The present disclosure relates to diagnosis of optical spectrometers, such as those used in some downhole tools. More particularly, some embodiments of the present disclosure relate to determining the operating condition of such a spectrometer after being used downhole in wells. This can include determining whether the spectrometer is ready for further downhole use or should be serviced before further use. As described in detail below, in some embodiments this determination can be made by assessing baseline drift of a spectrometer (e.g., resulting from window fouling and optical alignment change) and estimating the quantitative impacts of the baseline drift on prospective downhole measurements (or "answer products") that would be based on optical data from the spectrometer to determine if the spectrometer should be serviced.

Figure 1:
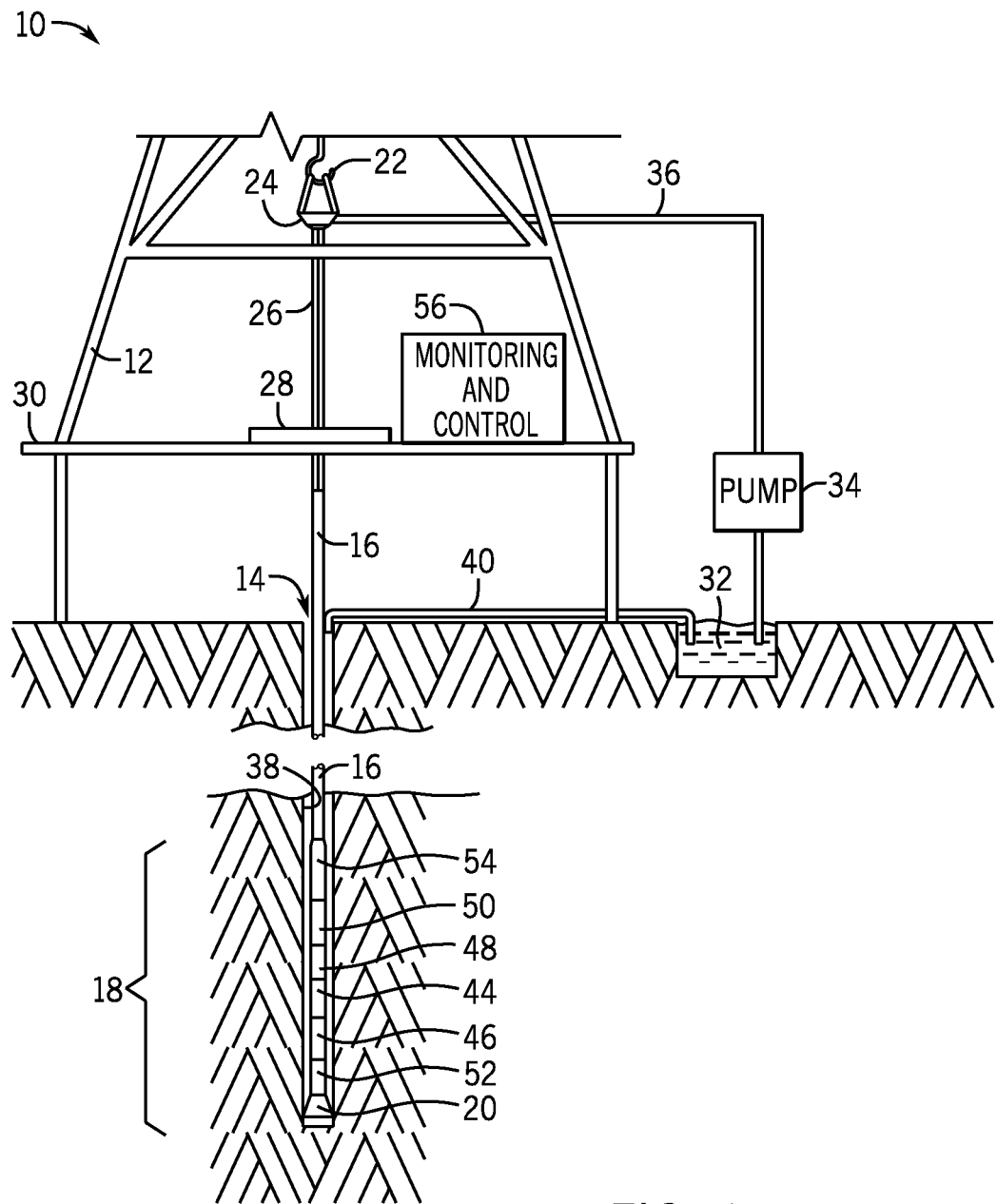
FIG. 1 generally depicts a drilling system having a fluid sampling tool in a drill string in accordance with one embodiment of the present disclosure.

Turning now to the drawings, a drilling system 10 is depicted in FIG. 1 in accordance with one embodiment. While certain elements of the drilling system 10 are depicted in this figure and generally discussed below, it will be appreciated that the drilling system 10 may include other components in addition to, or in place of, those presently illustrated and discussed. As depicted, the system 10 includes a drilling rig 12 positioned over a well 14. Although depicted as an onshore drilling system 10, it is noted that the drilling system could instead be an offshore drilling system. The drilling rig 12 supports a drill string 16 that includes a bottomhole assembly 18 having a drill bit 20. The drilling rig 12 can rotate the drill string 16 (and its drill bit 20) to drill the well 14.

The drill string 16 is suspended within the well 14 from a hook 22 of the drilling rig 12 via a swivel 24 and a kelly 26. Although not depicted in FIG. 1, the skilled artisan will appreciate that the hook 22 can be connected to a hoisting system used to raise and lower the drill string 16 within the well 14. As one example, such a hoisting system could include a crown block and a drawworks that cooperate to raise and lower a traveling block (to which the hook 22 is connected) via a hoisting line. The kelly 26 is coupled to the drill string 16, and the swivel 24 allows the kelly 26 and the drill string 16 to rotate with respect to the hook 22. In the presently illustrated embodiment, a rotary table 28 on a drill floor 30 of the drilling rig 12 is constructed to grip and turn the kelly 26 to drive rotation of the drill string 16 to drill the well 14. In other embodiments, however, a top drive system could instead be used to drive rotation of the drill string 16.

During operation, drill cuttings or other debris may collect near the bottom of the well 14. Drilling fluid 32, also referred to as drilling mud, can be circulated through the well 14 to remove this debris. The drilling fluid 32 may also clean and cool the drill bit 20 and provide positive pressure within the well 14 to inhibit formation fluids from entering the wellbore. In FIG. 1, the drilling fluid 32 is circulated through the well 14 by a pump 34. The drilling fluid 32 is pumped from a mud pit (or some other reservoir, such as a mud tank) into the drill string 16 through a supply conduit 36, the swivel 24, and the kelly 26. The drilling fluid 32 exits near the bottom of the drill string 16 (e.g., at the drill bit 20) and returns to the surface through the annulus 38 between the wellbore and the drill string 16. A return conduit 40 transmits the returning drilling fluid 32 away from the well 14. In some embodiments, the returning drilling fluid 32 is cleansed (e.g., via one or more shale shakers, desanders, or desilters) and reused in the well 14.

In addition to the drill bit 20, the bottomhole assembly 18 also includes various instruments that measure information of interest within the well 14. For example, as depicted in FIG. 1, the bottomhole assembly 18 includes a logging-while-drilling (LWD) module 44 and a measurement-while-drilling (MWD) module 46. Both modules include sensors, housed in drill collars, that collect data and enable the creation of measurement logs in real-time during a drilling operation. The modules could also include memory devices for storing the measured data. The LWD module 44 includes sensors that measure various characteristics of the rock and formation fluid properties within the well 14. Data collected by the LWD module 44 could include measurements of gamma rays, resistivity, neutron porosity, formation density, sound waves, optical density, and the like. The MWD module 46 includes sensors that measure various characteristics of the bottomhole assembly 18 and the wellbore, such as orientation (azimuth and inclination) of the drill bit 20, torque, shock and vibration, the weight on the drill bit 20, and downhole temperature and pressure. The data collected by the MWD module 46 can be used to control drilling operations. The bottomhole assembly 18 can also include one or more additional modules 48, which could be LWD modules, MWD modules, or some other modules. It is noted that the bottomhole assembly 18 is modular, and that the positions and presence of particular modules of the assembly could be changed as desired. Further, as discussed in greater detail below, one or more of the modules 44, 46, and 48 could include a fluid sampling tool configured to obtain a sample of a fluid from a subterranean formation and perform downhole fluid analysis to measure properties (e.g., contamination and optical densities) of the sampled fluid.

The bottomhole assembly 18 can also include other modules. As depicted in FIG. 1 by way of example, such other modules include a power module 50, a steering module 52, and a communication module 54. In one embodiment, the power module 50 includes a generator (such as a turbine) driven by flow of drilling mud through the drill string 16. In other embodiments the power module 50 could also or instead include other forms of power storage or generation, such as batteries or fuel cells. The steering module 52 may include a rotary-steerable system that facilitates directional drilling of the well 14. The communication module 54 enables communication of data (e.g., data collected by the LWD module 44 and the MWD module 46) between the bottomhole assembly 18 and the surface. In one embodiment, the communication module 54 communicates via mud pulse telemetry, in which the communication module 54 uses the drilling fluid 32 in the drill string as a propagation medium for a pressure wave encoding the data to be transmitted.

The drilling system 10 also includes a monitoring and control system 56. The monitoring and control system 56 can include one or more computer systems that enable monitoring and control of various components of the drilling system 10. The monitoring and control system 56 can also receive data from the bottomhole assembly 18 (e.g., data from the LWD module 44, the MWD module 46, and the additional module 48) for processing and for communication to an operator, to name just two examples. While depicted on the drill floor 30 in FIG. 1, it is noted that the monitoring and control system 56 could be positioned elsewhere, and that the system 56 could be a distributed system with elements provided at different places near or remote from the well 14.

Figure 2:
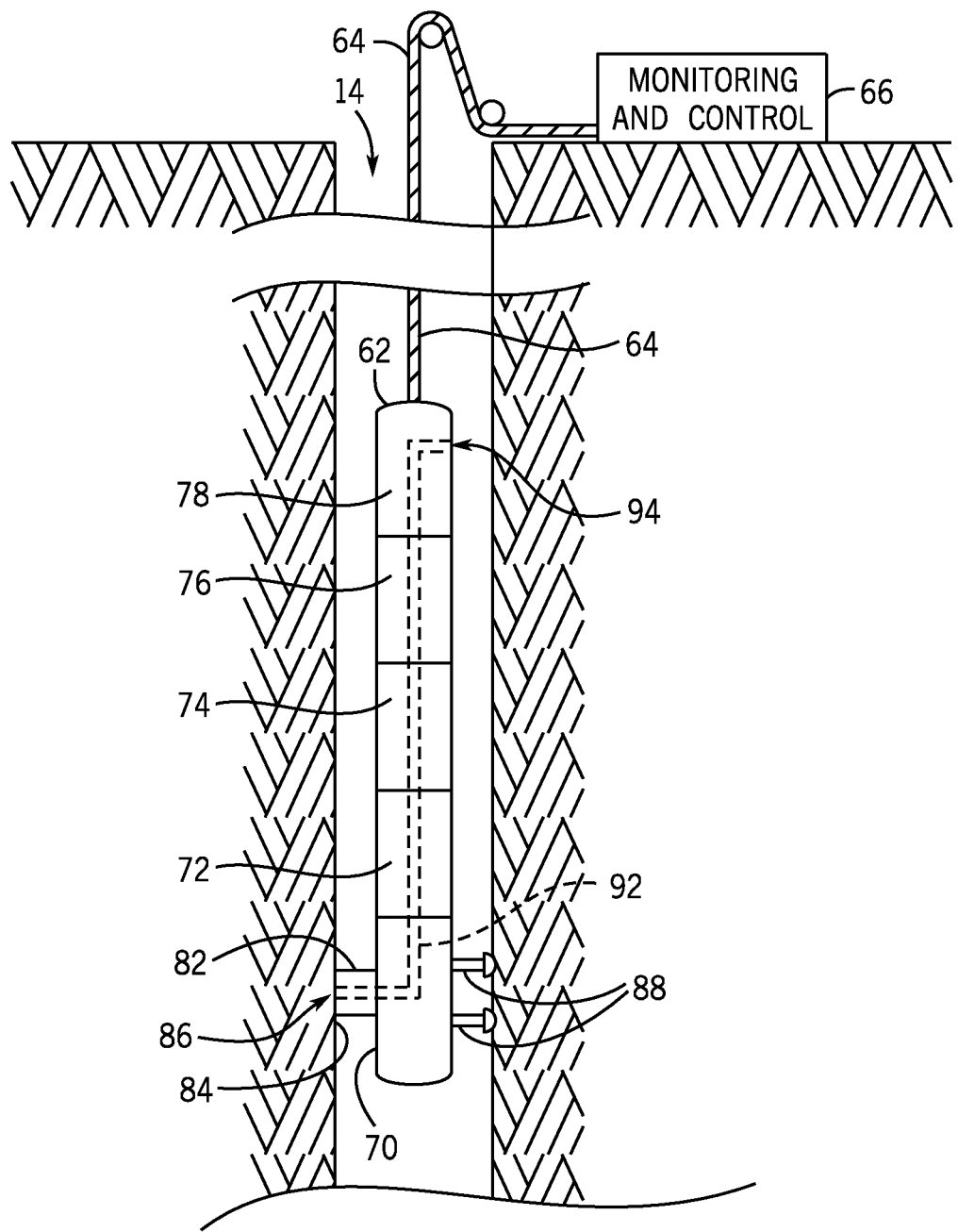
FIG. 2 generally depicts a fluid sampling tool deployed within a well on a wireline in accordance with one embodiment.

Another example of using a downhole tool for formation testing within the well 14 is depicted in FIG. 2. In this embodiment, a fluid sampling tool 62 is suspended in the well 14 on a cable 64. The cable 64 may be a wireline cable with at least one conductor that enables data transmission between the fluid sampling tool 62 and a monitoring and control system 66. The cable 64 may be raised and lowered within the well 14 in any suitable manner. For instance, the cable 64 can be reeled from a drum in a service truck, which may be a logging truck having the monitoring and control system 66. The monitoring and control system 66 controls movement of the fluid sampling tool 62 within the well 14 and receives data from the fluid sampling tool 62. In a similar fashion to the monitoring and control system 56 of FIG. 1, the monitoring and control system 66 may include one or more computer systems or devices and may be a distributed computing system. The received data can be stored, communicated to an operator, or processed, for instance. While the fluid sampling tool 62 is here depicted as being deployed by way of a wireline, in some embodiments the fluid sampling tool 62 (or at least its functionality) is incorporated into or as one or more modules of the bottomhole assembly 18, such as the LWD module 44 or the additional module 48.

The fluid sampling tool 62 can take various forms. While it is depicted in FIG. 2 as having a body including a probe module 70, a fluid analysis module 72, a pump module 74, a power module 76, and a fluid storage module 78, the fluid sampling tool 62 may include different modules in other embodiments. The probe module 70 includes a probe 82 that may be extended (e.g., hydraulically driven) and pressed into engagement against a wall 84 of the well 14 to draw fluid from a formation into the fluid sampling tool 62 through an intake 86. As depicted, the probe module 70 also includes one or more setting pistons 88 that may be extended outwardly to engage the wall 84 and push the end face of the probe 82 against another portion of the wall 84. In some embodiments, the probe 82 includes a sealing element or packer that isolates the intake 86 from the rest of the wellbore. In other embodiments the fluid sampling tool 62 could include one or more inflatable packers that can be extended from the body of the fluid sampling tool 62 to circumferentially engage the wall 84 and isolate a region of the well 14 near the intake 86 from the rest of the wellbore. In such embodiments, the extendable probe 82 and setting pistons 88 could be omitted and the intake 86 could be provided in the body of the fluid sampling tool 62, such as in the body of a packer module housing an extendable packer.

The pump module 74 draws the sampled formation fluid into the intake 86, through a flowline 92, and then either out into the wellbore through an outlet 94 or into a storage container (e.g., a bottle within fluid storage module 78) for transport back to the surface when the fluid sampling tool 62 is removed from the well 14. The fluid analysis module 72 includes one or more sensors for measuring properties of the sampled formation fluid, such as the optical density of the fluid, and the power module 76 provides power to electronic components of the fluid sampling tool 62.

The drilling and wireline environments depicted in FIGS. 1 and 2 are examples of environments in which a fluid sampling tool may be used to facilitate analysis of a downhole fluid. The presently disclosed techniques, however, could be implemented in other environments as well. For instance, the fluid sampling tool 62 may be deployed in other manners, such as by a slickline, coiled tubing, or a pipe string.

Figure 3:
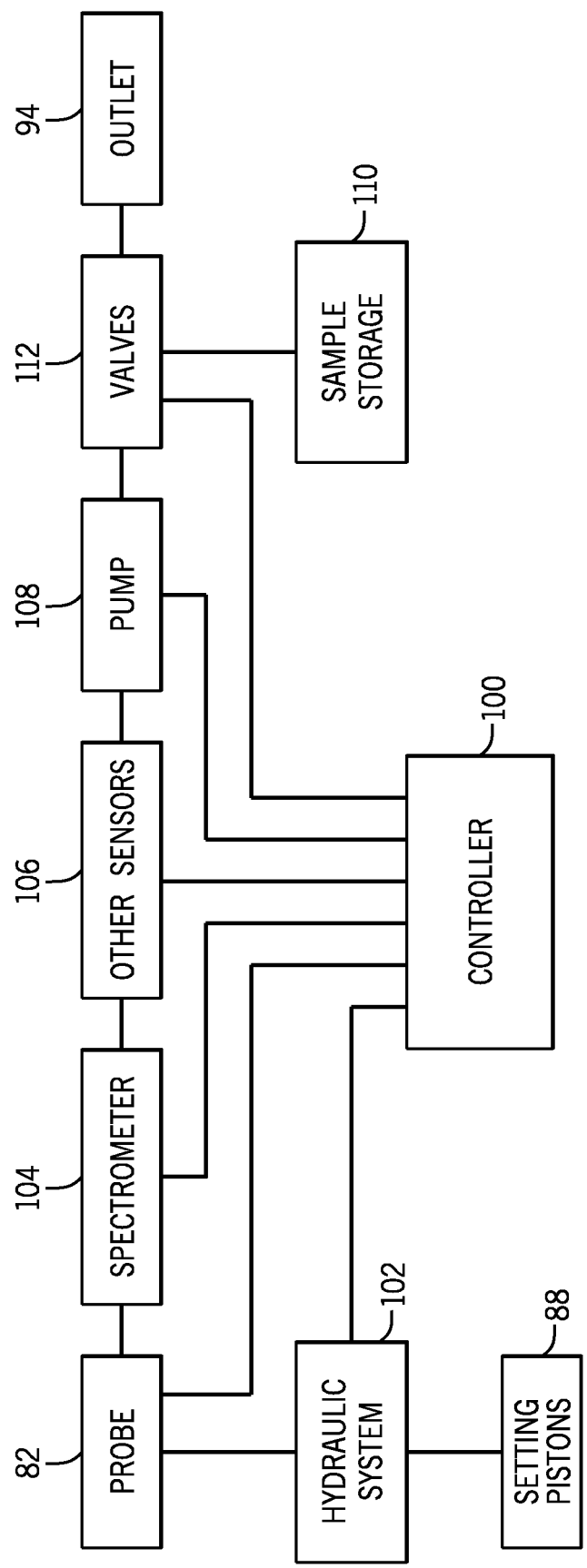
FIG. 3 is a block diagram of components of a fluid sampling tool operated by a controller in accordance with one embodiment.

Additional details as to the construction and operation of the fluid sampling tool 62 may be better understood through reference to FIG. 3. As shown in this figure, various components for carrying out functions of the fluid sampling tool 62 are connected to a controller 100. The various components include a hydraulic system 102 connected to the probe 82 and the setting pistons 88, a spectrometer 104 for measuring fluid optical properties, one or more other sensors 106, a pump 108, and valves 112 for diverting sampled fluid into storage devices 110 rather than venting it through the outlet 94.

In operation, the hydraulic system 102 extends the probe 82 and the setting pistons 88 to facilitate sampling of a formation fluid through the wall 84 of the well 14. It also retracts the probe 82 and the setting pistons 88 to facilitate subsequent movement of the fluid sampling tool 62 within the well. The spectrometer 104, which can be positioned within the fluid analysis module 72, collects data about optical properties of the sampled formation fluid. Such measured optical properties can include optical densities (absorbance) of the sampled formation fluid at different wavelengths of electromagnetic radiation. Using the optical densities, the composition of a sampled fluid (e.g., volume fractions of its constituent components) can be determined. Other sensors 106 can be provided in the fluid sampling tool 62 (e.g., as part of the probe module 70 or the fluid analysis module 72) to take additional measurements related to the sampled fluid. In various embodiments, these additional measurements could include pressure and temperature, density, viscosity, electrical resistivity, saturation pressure, and fluorescence, to name several examples. Other characteristics, such as gas-oil ratio (GOR), can also be determined using the measurements.

Any suitable pump 108 may be provided in the pump module 74 to enable formation fluid to be drawn into and pumped through the flowline 92 in the manner discussed above. Storage devices 110 for formation fluid samples can include any suitable vessels (e.g., bottles) for retaining and transporting desired samples within the fluid sampling tool 62 to the surface. Both the storage devices 110 and the valves 112 may be provided as part of the fluid storage module 78.

In the embodiment depicted in FIG. 3, the controller 100 facilitates operation of the fluid sampling tool 62 by controlling various components. Specifically, the controller 100 directs operation (e.g., by sending command signals) of the hydraulic system 102 to extend and retract the probe 82 and the setting pistons 88 and of the pump 108 to draw formation fluid samples into and through the fluid sampling tool. The controller 100 also receives data from the spectrometer 104 and the other sensors 106. This data can be stored by the controller 100 or communicated to another system (e.g., the monitoring and control system 56 or 66) for analysis. In some embodiments, the controller 100 is itself capable of analyzing the data it receives from the spectrometer 104 and the other sensors 106. The controller 100 also operates the valves 112 to divert sampled fluids from the flowline 92 into the storage devices 110.

Figure 4:
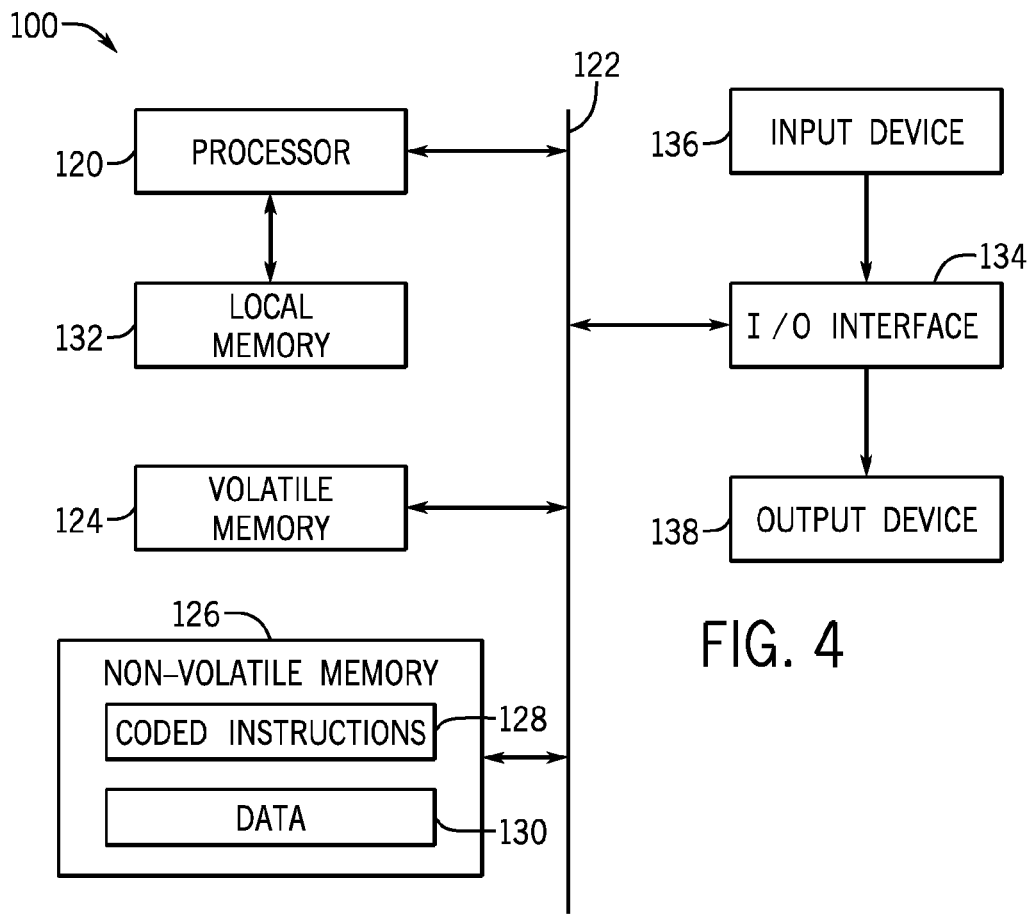
FIG. 4 is a block diagram of components in one example of the controller illustrated in FIG. 3.

The controller 100 in some embodiments is a processor-based system, an example of which is provided in FIG. 4. In this depicted embodiment, the controller 100 includes at least one processor 120 connected, by a bus 122, to volatile memory 124 (e.g., random-access memory) and non-volatile memory 126 (e.g., flash memory and a read-only memory (ROM)). Coded application instructions 128 (e.g., software that may be executed by the processor 120 to enable the control and analysis functionality described herein) and data 130 are stored in the non-volatile memory 126. For example, the application instructions 128 can be stored in a ROM and the data can be stored in a flash memory. The instructions 128 and the data 130 may be also be loaded into the volatile memory 124 (or in a local memory 132 of the processor) as desired, such as to reduce latency and increase operating efficiency of the controller 100.

An interface 134 of the controller 100 enables communication between the processor 120 and various input devices 136 and output devices 138. The interface 134 can include any suitable device that enables such communication, such as a modem or a serial port. In some embodiments, the input devices 136 include one or more sensing components of the fluid sampling tool 62 (e.g., the spectrometer 104) and the output devices 138 include displays, printers, and storage devices that allow output of data received or generated by the controller 100. Input devices 136 and output devices 138 may be provided as part of the controller 100, although in other embodiments such devices may be separately provided.

The controller 100 can be provided as part of the monitoring and control systems 56 or 66 outside of a well 14 to enable downhole fluid analysis of samples obtained by the fluid sampling tool 62. In such embodiments, data collected by the fluid sampling tool 62 can be transmitted from the well 14 to the surface for analysis by the controller 100. In some other embodiments, the controller 100 is instead provided within a downhole tool in the well 14, such as within the fluid sampling tool 62 or in another component of the bottomhole assembly 18, to enable downhole fluid analysis to be performed within the well 14. Further, the controller 100 may be a distributed system with some components located in a downhole tool and others provided elsewhere (e.g., at the surface of the wellsite).

Whether provided within or outside the well 14, the controller 100 can receive data collected by the sensors within the fluid sampling tool 62 and process this data to determine one or more characteristics of the sampled fluid. Examples of such characteristics include fluid type, GOR, carbon dioxide content, water content, and contamination level.

Some of the data collected by the fluid sampling tool 62 relates to optical properties (e.g., optical densities) of a sampled fluid measured by the spectrometer 104. To facilitate measurements, in some embodiments the spectrometer 104 may be arranged about the flowline 92 of the fluid sampling tool 62 in the manner generally depicted in FIG. 5. In this example, the spectrometer 104 includes an emitter 142 of electromagnetic radiation, such as a light source, and a detector 144 disposed about the flowline 92 in the fluid sampling tool 62. A light source provided as the emitter 142 can be any suitable light-emitting device, such as one or more light-emitting diodes or incandescent lamps. As used herein, the term "visible light" is intended to mean electromagnetic radiation within the visible spectrum, and the shorter term "light" is intended to include not just electromagnetic radiation within the visible spectrum, but also infrared and ultraviolet radiation.

Figure 5:
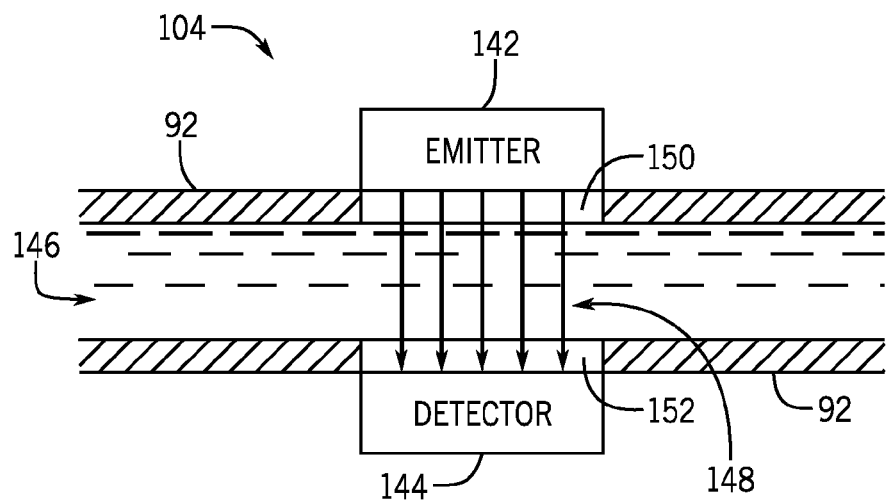
FIG. 5 generally depicts a spectrometer positioned about a flowline to enable measurement of an optical property of a fluid within the flowline in accordance with one embodiment.

In operation, a sampled formation fluid 146 within the flowline 92 is irradiated with electromagnetic radiation 148 (e.g., light) from the emitter 142. The electromagnetic radiation 148 includes radiation of any desired wavelengths within the electromagnetic spectrum. In some embodiments, the electromagnetic radiation 148 has a continuous spectrum within one or both of the visible range and the short- and near-infrared (SNIR) range of the electromagnetic spectrum, and the detector 144 filters or diffracts the received electromagnetic radiation 148. The detector 144 may include a plurality of detectors each assigned to separately measure light of a different wavelength. As depicted in FIG. 5, the flowline 92 includes windows 150 and 152 (e.g., sapphire windows) that isolate the emitter 142 and the detector 144 from the sampled formation fluid 146 while still permitting the electromagnetic radiation 148 to be transmitted and measured. As will be appreciated, some portion of the electromagnetic radiation 148 is absorbed by the sampled fluid 146, and the extent of such absorption varies for different wavelengths and sampled fluids. The optical density of the fluid 146 at one or more wavelengths may be determined based on data from the spectrometer 104 by comparing the amount of radiation emitted by the emitter 142 and the amount of that radiation received at detector 144. It will be appreciated that the optical density (also referred to as the absorbance) of a fluid at a given wavelength is calculated as the base-ten logarithm of the ratio of electromagnetic radiation incident on the fluid to that transmitted through the fluid for the given wavelength.

The spectrometer 104 may include any suitable number of measurement channels for detecting different wavelengths, and may include a filter-array spectrometer or a grating spectrometer. For example, in some embodiments the spectrometer 104 is a filter-array absorption spectrometer having sixteen measurement channels. In other embodiments, the spectrometer 104 may have ten channels or twenty channels, and may be provided as a filter-array spectrometer or a grating spectrometer. Further, as noted above, the data obtained with the spectrometer 104 can be used to determine optical densities of sampled fluids.

Figure 6:
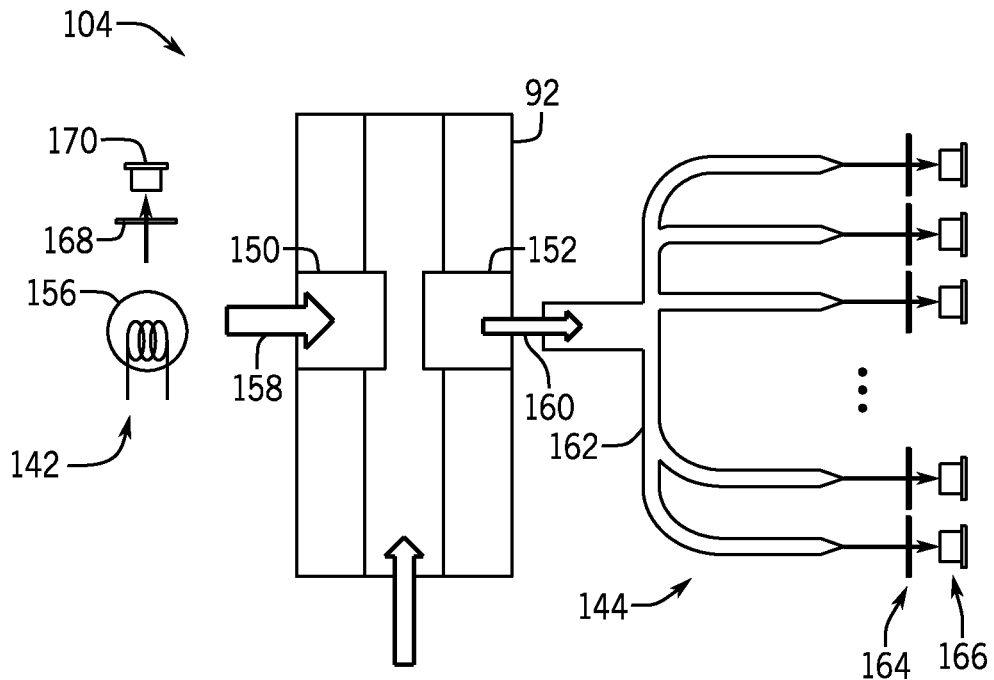
FIG. 6 is an example of a filter-array spectrometer for measuring an optical property of a flowline fluid in accordance with one embodiment.

By way of example, in one embodiment the spectrometer 104 is provided in the form generally depicted in FIG. 6. In this depicted embodiment, the spectrometer 104 is a filter-array spectrometer that can be used to monitor fluids flowing in the flowline 92 in a high-temperature and high-pressure environment. Windows 150 and 152 can isolate other optical components of the spectrometer 104 from high-pressure fluid within the flowline 92, while being transparent to a wavelength range of interest to facilitate optical analysis of the fluid.

As shown in FIG. 6, the spectrometer 104 includes a lamp 156 (e.g., a halogen lamp) as the light source 142. Input light 158 passes from the lamp 156 through the window 150 into fluid within the flowline 92. Some of the light 158 may be absorbed by the fluid depending on wavelength and, thus, the intensity of output light 160 is wavelength-dependent. To detect this wavelength dependency, the output light 160 is distributed using optical fibers 162 to detector measurement channels 166 (e.g., photodiodes). In this example, each detector measurement channel extracts a certain wavelength band of interest using a band pass optical filter 164. The output signal from the detectors is proportional to light intensity, which may depend on many different optical parameters as well as absorptivity of the fluid in the flowline 92. These optical parameters may include light source intensity, transmittance in optical fibers, optical filters, sensitivity of the detectors, optical alignment, and so forth. In order to compensate for the effect of those parameters, optical spectrometers receive baseline calibration. Optical absorbance, also referred to as optical density (OD), is defined as the negative logarithm of output ($I_{OUT}$) over input ($I_{IN}$) light intensity. One or more reference channels 170 (with or without an optical filter 168) can be used to measure the intensity of the input light from the light source 142 (e.g., lamp 156), and the measurement channels 166 can be used to measure intensity of output light. As the input and output optical intensities are, respectively, proportional to signals from the reference, $V_r(\lambda)$, and the measure, $V_m(\lambda)$, channels, the OD at each detector (wavelength, $\lambda$) channel is estimated as follows:

$$OD(\lambda) = -\log\left(\frac{I_{out}(\lambda)}{I_{IN}(\lambda)}\right) \quad (1)$$
$$= -\log\left(\frac{b(\lambda) \cdot V_m(\lambda)}{a(\lambda) \cdot V_r(\lambda)}\right)$$
$$= -\log\left(\frac{V_m(\lambda)}{V_r(\lambda)}\right) - \log\left(\frac{b(\lambda)}{a(\lambda)}\right)$$
$$= -\log\left(\frac{V_m(\lambda)}{V_r(\lambda)}\right) + A(\lambda)$$

Baseline calibration can determine the bias $A(\lambda)$ by assuming OD of air at ambient conditions is approximately equal to zero when the windows 150 and 152 are clean (i.e., under a clean window condition):

$$OD = 0 = -\log\left(\frac{V_m(\lambda)}{V_r(\lambda)}\right) + A(\lambda), \quad (2)$$

thus, $$A(\lambda) = \log\left(\frac{V_m(\lambda)}{V_r(\lambda)}\right)$$

The baseline calibration could be carried out prior to each downhole use of the spectrometer to compensate for the bias (baseline) drift potentially caused by mechanical or temperature stress in previous uses changing optical alignments, breaking some optical fibers, or the like. The drift can be either negative or positive, as light intensity can either increase or decrease depending on alignment change at each detector. Since the OD in a dry condition is assumed to be zero, no contaminant is allowed for the baseline calibration.

As noted above, downhole optical spectrometers may be used for monitoring and analyzing properties of fluid in the flowline in real-time during a sampling operation. One challenge for downhole spectrometer development and use in the field is to manage calibration (baseline) drifts since the spectrometers are often exposed to harsh environments (e.g., high shock, vibration, and temperature) that can cause permanent optical misalignment or other physical changes resulting in optical drift. Once substantial optical drifts occur, baseline recalibration can be performed to compensate for the drifts. In general, baseline calibration on laboratory optical spectrometers may be performed under clean conditions prior to each experiment. In contrast, a clean condition is often not the case for downhole spectrometers. Instead, after downhole operations, the windows of downhole spectrometers are often fouled with mud particles or formation fluids. The spectrometers could be disassembled after each downhole use to physically clean the optical windows (returning the spectrometers to a clean condition), but this is a time-consuming process due to limited accessibility to the optical windows.

To reduce the frequency with which a spectrometer is disassembled and cleaned, some embodiments of the present disclosure can be used to diagnose the operating condition of the spectrometer. This may, in some instances, facilitate re-use of the spectrometer in multiple downhole operations without disassembling and physically cleaning optical windows of the spectrometer between the downhole operations. By way of example, a process for diagnosing the operating condition of a spectrometer is generally represented, in accordance with certain embodiments, by flowchart 180 in FIG. 7. Although the presently disclosed diagnosis techniques may be used with a spectrometer of a downhole tool, it will be appreciated that these techniques could also be used with other spectrometers.

Figure 7:
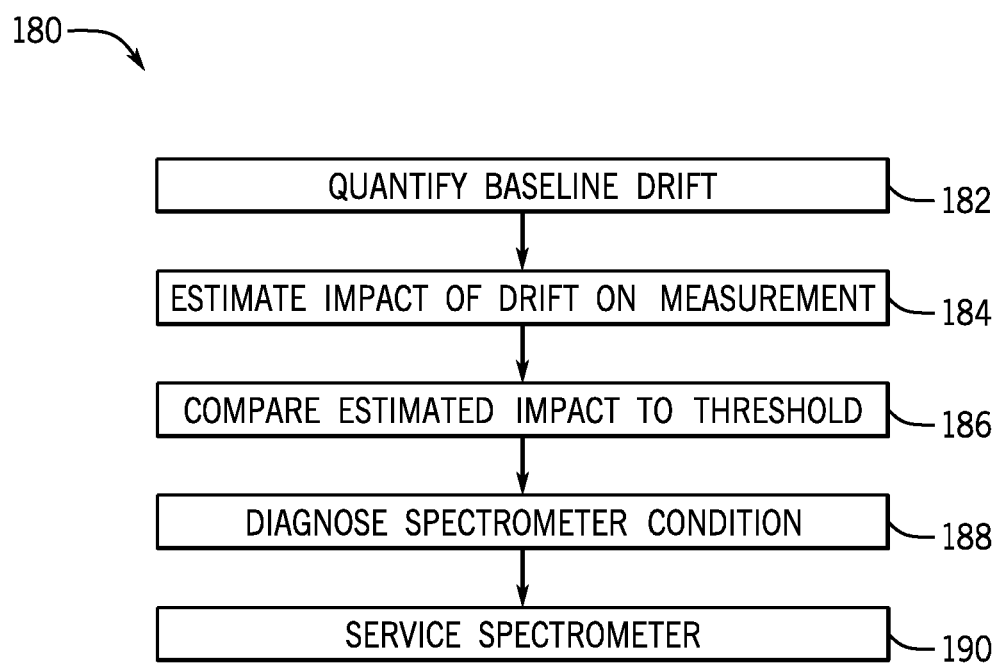
FIG. 7 is a flowchart for diagnosing the condition of a spectrometer in accordance with one embodiment.

As shown in FIG. 7 and described in greater detail below, a method can include quantifying baseline drift for a spectrometer (block 182); estimating impact of the quantified baseline drift on the accuracy of future answer products or other measurements (block 184); and directly or indirectly comparing the estimated impact to a threshold level (block 186), which could include determining whether an impacted answer product would still fall within desired criteria (e.g., an acceptable error range). In at least some embodiments, each of these actions is performed at the surface (rather than downhole) at a wellsite after downhole use of the spectrometer. Additionally, these actions could be performed by the controller 100 or some other processor-based system (e.g., monitoring system 56 or 66). The condition of the spectrometer can then be diagnosed (block 188). For example, if the impacted answer products would still fall within desired criteria, the spectrometer could be diagnosed as being ready for further use (e.g., for continued downhole operation). If, on the other hand, one or more of the impacted answer products would fall outside the desired criteria, diagnosing the spectrometer could include recommending servicing before returning the spectrometer to operation and the spectrometer could then be serviced (block 190). This can include any suitable actions to ready the spectrometer for further use, such as recalibrating the spectrometer, applying compensation to the spectrometer, or disassembling the spectrometer to access and physically clean its windows (e.g., to remove particles or residue that may cause scattering).

As described in greater detail below, in some instances a process for diagnosing the condition of a spectrometer can include cleaning a flowline of the spectrometer and selecting an appropriate data set from optical data recorded during cleaning for inspecting baseline drifts. The process can also include separately estimating optical drifts (from physical changes in the spectrometer) and light scattering (from fouling on the optical windows), and estimating the impact of baseline drift (from optical drifts and light scattering) on the answer products to determine if spectrometer baseline recalibration or other servicing is called for.

Fouling on optical windows can include mud particles and some residue of formation fluids, such as crude oils and water. The residue can be removed from the optical windows by flushing the flowline with liquid (such as water or some other solvent) and then drying the flowline by flushing it with a gas (such as air). In many cases, however, mud particles still stay on the optical windows and cause scattering of incident light. In many instances, elastic light scattering (e.g., Rayleigh, Mie, or geometric scattering) is dominant and a scattering spectrum will depend on surface properties, size distribution, concentration of the scattering objects, and so forth. It is known that Rayleigh scattering can be described as a function of wavelength, $\Delta$, by the following equation:

$$x_{scattering}(\Delta) \approx \alpha/\lambda^4 \qquad (3)$$

where $\alpha$ is a constant parameter determined by surface properties, size distribution, concentration, and incident angle of light. In many cases, scattering spectra due to particles with broad size distribution behave as a decay spectrum as a function of wavelength, $\lambda$, and may be approximately described as:

$$x_{scattering}(\lambda) = \alpha/\lambda^k + \beta\lambda + \gamma \qquad (4)$$

In at least one embodiment, k=2 may be used. In addition, optical drift may be present and a measured optical spectrum of air, $x(\lambda)$, with fouling on optical windows is described by:

$$x(\lambda) = x_{scattering}(\lambda) + x_{drift}(\lambda) \qquad (5)$$

It is noted that $x_{scattering}$ is an estimated scattering spectrum using eq. (4) and that $x_{drift}(\lambda)$ may include other contributions to OD, such as optical drift of a downhole optical spectrometer and some absorbance by residue other than scattering on the optical windows.

With a vector form, eq. (4) and (5) may be described as follows:

$$x = x_{scattering} + x_{drift} \qquad (6)$$

$$x_{scattering} = S \cdot C \qquad (7)$$

where, $$x = [x(\lambda_1), x(\lambda_2), \ldots, x(\lambda_n)]^T, \qquad (8)$$
$$C = [\alpha, \beta, \gamma]^T,$$
$$x_{drift} = [x_{drift}(\lambda_1), x_{drift}(\lambda_2), \ldots, x_{drift}(\lambda_n)]^T$$

$$S = \begin{pmatrix} \frac{1}{\lambda_1^k} & \lambda_1 & 1 \\ \frac{1}{\lambda_2^k} & \lambda_2 & 1 \\ \vdots & \vdots & \vdots \\ \frac{1}{\lambda_n^k} & \lambda_n & 1 \end{pmatrix}$$

While flushing the flowline with air after flushing the flowline with water or another solvent, an optical drift component of $x_{drift}$ in eq. (6) would not change, since no mechanical or thermal shock is expected during flowline cleaning. Water or solvent residues (which may contribute to $x_{drift}$) may change, however, and $x_{drift}$ would decrease as the residues are removed by the air. In accordance with certain embodiments, the $j^{th}$ data set, $x_j$, in a series of data sets $\{x\}$ observed during a cleaning process (e.g., during flushing of the flowline with water and then with air) is selected based on estimated scattering and residue using the equation below:

$$j = \operatorname{argmin}_i \left\{ \sum_\lambda (x_{i,scattering}(\lambda) + \tau |x_{i,drift}(\lambda)|) \right\} = \operatorname{argmin}_i \{h_i\} \qquad (9)$$

where $x_{i,scattering}$ denotes the $i^{th}$ data set in the data series, and $\tau$ is a weighting factor. Eq. (9) selects least scattering and residuals from the recorded data series during the cleaning process.

From eq. (6) and (7), $C_i$ for $x_{i,scattering}$ can be determined from $x_i$ by minimizing $x_{i,drift}$ as follows:

$$C_i = (S^T W S + \epsilon^2 I)^{-1} S^T W^T x_i \qquad (10)$$

where W is a (m×m) diagonal matrix weighting on wavelength channels. To determine $C_i$ with less influences from residuals, W may be down-weighted on channels associated with strong absorbance peaks of residue (e.g., water residue), and may be up-weighted on reliable channels where less absorbance (e.g., by water) is present. Further, the term $\epsilon^2 I$ (Tikhonov regularization) may be included in the equation to gain stability of estimating $C_i$ and to mitigate overfitting the data. I is an identity matrix, and $\epsilon$=0.001 in at least one embodiment. From the measured $x_i$ and obtained $x_{i,scattering}$, $x_{i,drift}$ in eq. (9) can be obtained:

$$x_{i,drift} = x_i - x_{i,scattering} \qquad (11)$$

Figure 8:
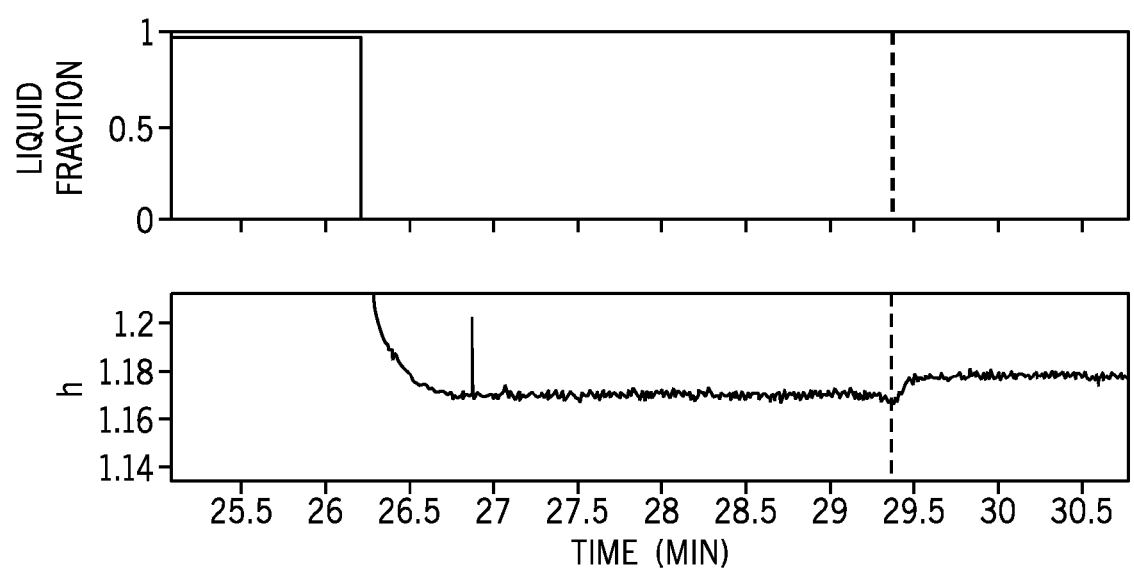
FIG. 8 graphically represents a liquid fraction of fluid in a downhole tool flowline and an optical parameter determined through analysis of the fluid with a spectrometer over a period of time during flushing of the flowline with water and air in accordance with one embodiment.
Figure 9:
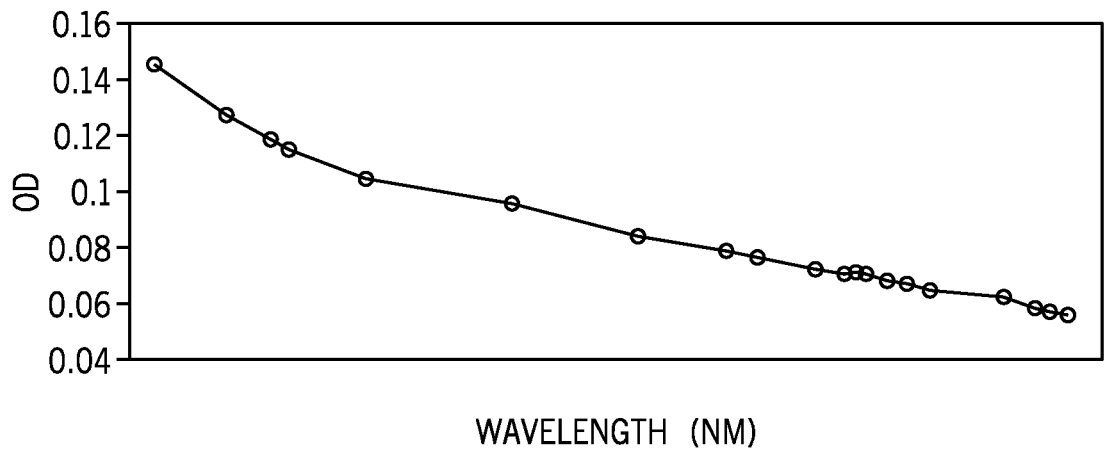
FIG. 9 is an example of a data set selected from optical data acquired by the spectrometer during flushing of the flowline in accordance with one embodiment.

FIG. 8 shows results during a process of cleaning the flowline of a downhole tool spectrometer through flushing with a liquid (e.g., water) followed by a gas (e.g., air). The top graph depicts liquid fraction in the flowline estimated from optical absorbance. Initially, the liquid fraction is nearly equal to one since the flowline is filled with circulating liquid. The bottom graph indicates h value (with $\tau$=10) obtained from eq. (9). The dashed vertical line is located at a time where a data set is selected from the data acquired during flushing of the flowline. In this example, OD at t~29.3 minutes (generally represented by the spectrum depicted in FIG. 9) has the minimum.

In the process described above, $j^{th}$ data set, $x_j$, was selected from a series of data sets observed during the cleaning process. Next, the confidence intervals (or potential variability) of scattering spectrum and optical drifts (and residues) in addition to their maximum likelihood can be estimated from probability density function of $x_{j,\ scattering}$. For notational simplicity, x is used to indicate the selected $j^{th}$ dataset $x_j$ in the following description.

There may be various ways to obtain a probability density function of $x_{scattering}$. The maximum likelihood and covariance matrices can be obtained from replicated sample sets using a resampling method, such as a bootstrap technique for the dataset x (previously obtained as $x_j$). For example, a resampling method can include, supposing x contains n wavelength channels, $\lambda_m$ (m∈$I_n$):

1. Drawing k wavelength channels randomly from the n wavelength channels (k~63% of n channels);
   $x^{(1)}$, $S^{(1)}$, $W^{(1)}$, the superscript (1) indicates the first replication
2. Determining $C^{(1)}$, and computing $x^{(1)}_{scattering}$, $x^{(1)}_{drift}$ $C^{(1)} = (S^{(1)T} W^{(1)} S^{(1)} + \epsilon^2 I)^{-1} S^{(1)T} W^{(1)T} x^{(1)}$ $x^{(1)}_{scattering} = C_i^{(1)} S^{(1)}$ $x^{(1)}_{drift} = x^{(1)} - x^{(1)}_{scattering}$ (12)

3. Repeating items 1 and 2 z times (e.g., z=10,000) with sample replacement.

Figure 10:
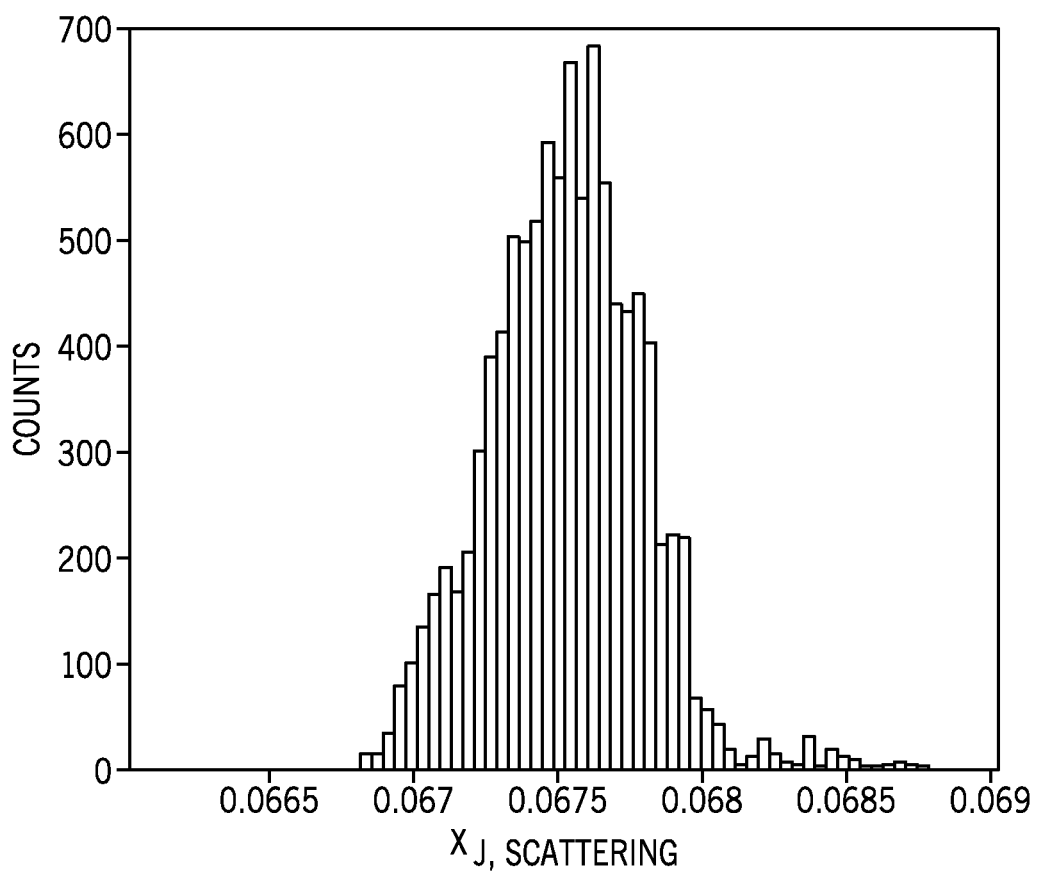
FIG. 10 depicts a representative probability density function for scattering at one wavelength of the data set selected from the acquired optical data in accordance with one embodiment.

Generating dataset of $\{x_{scattering}^{(1)}, \ldots, x_{scattering}^{(z)}\}$, and $\{x_{drift}^{(1)}, \ldots, x_{drift}^{(z)}\}$ From the replicated dataset, $\{x_{scattering}^{(p)}\}$ and $\{x_{drift}^{(p)}\}$, one could obtain a probability density function of $x_{scattering}$ and $x_{drift}$ under given conditions of x and $I(P(x_{scattering}|x, I))$. The condition, I, includes predefined parameters such as W, S, and ε in eq. (12). FIG. 10 shows an example of the probability density function of $x_{scattering}$ (for a wavelength corresponding to an oil peak) obtained from the 10,000 replicates, $\{x_{scattering}^{(p)}\}_{p \in I_z}$.

Estimated $x_{scattering}$ can be broken into its expected value and uncertainty:

$x_{scattering} = \bar{x}_{scattering} \pm \delta x_{scattering}$ (13)

Further, the expected value of $x_{scattering}$ can be obtained from the probability density function as follows:

$\bar{x}_{scattering} = \int x_{scattering} P(x_{scattering}|x, I) dx_{scattering}$ (14)

where $\int P(x_{scattering}|x, I) dx_{scattering} = 1$

Or, more simply in the case of a normal distribution:

$$\bar{x}_{scattering} = \sum_p \frac{x_{scattering}^p}{z}$$ (15)

Uncertainty, $\delta x_{scattering}$, can be approximately obtained from $\{x^{(p)}_{scattering}\}$:

$(\delta x_{scattering})^2 \approx \text{diag}(\text{cov}(x_{scattering}))$ (16)

Diag(.) and cov(.) denote diagonal elements and covariance matrix of (.). Likewise, the expected value and uncertainty of $x_{drift}$ may also be obtained:

$$x_{drift} = \sum_p \frac{x_{drift}^p}{z}$$ (17)

$(\delta x_{drift})^2 \approx \text{diag}(\text{cov}(x_{drift}))$ (18)

Figure 11:
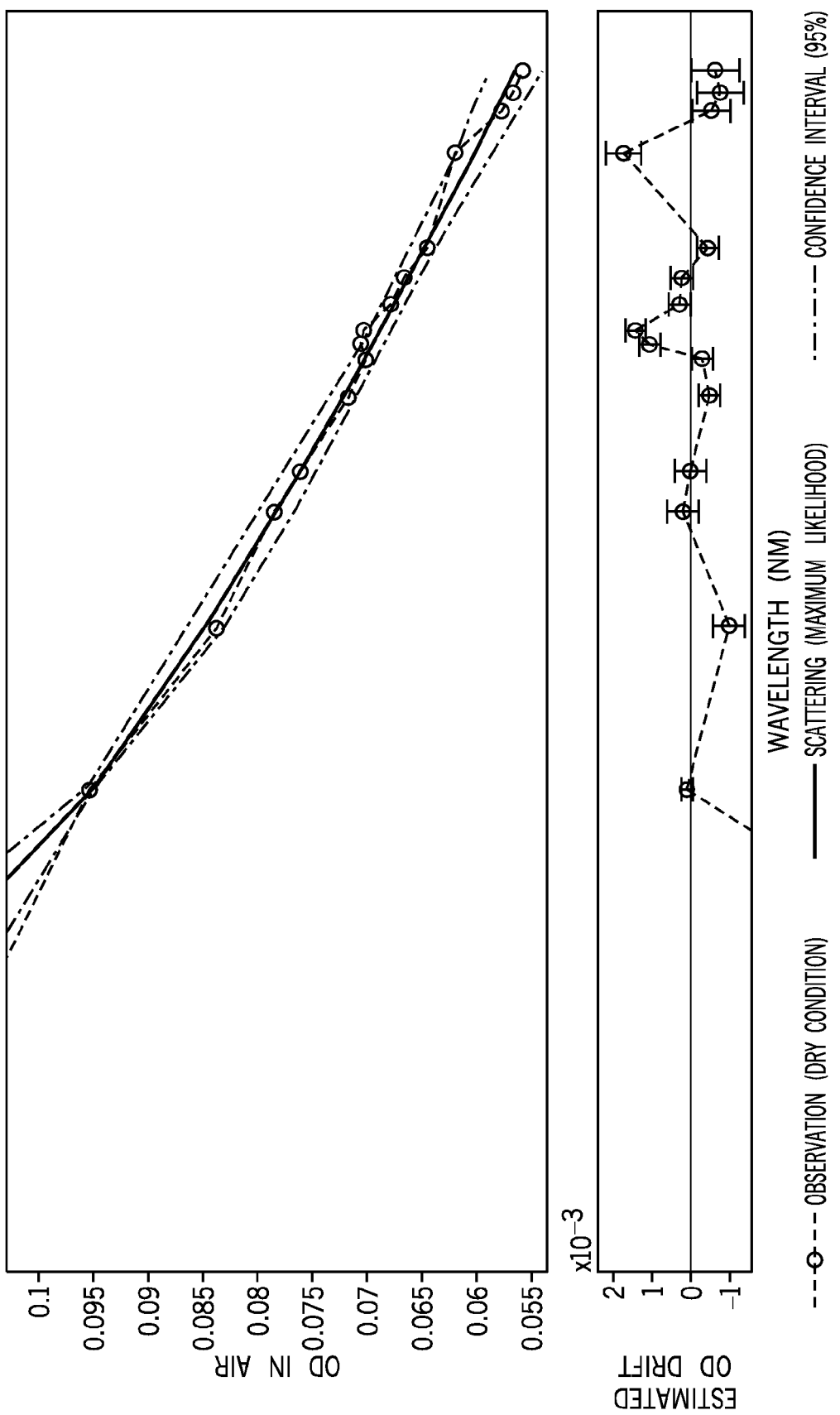
FIG. 11 graphically represents optical density measured with a spectrometer having fouled optical windows and air in the flowline, and also depicts an estimated scattering spectrum and estimated optical drifts for the spectrometer, in accordance with one embodiment.

FIG. 11 depicts, in accordance with one embodiment, an upper graph of optical density in a dry condition (air) with fouled optical windows and estimated scattering spectrum with its uncertainty (95%), and a lower graph of the estimated drift of optical density with its uncertainty. In the shorter wavelength range of this example not shown in FIG. 11 (in which those wavelengths may have optical densities in air above 0.1), the scattering spectrum is not well-fitted and estimated OD drift is relatively large. This is because those shorter wavelengths (e.g., visible wavelengths) may be down-weighted in the weighting matrix, with the focus instead on the near-infrared range that is more influential to the answer products in at least some embodiments.

A measured optical spectrum of reservoir fluid ($x_{sample}$) and predicted concentrations of components of interest ($y_{sample}$) are described by:

$y_{sample} = x_{sample} B$ (19)

where, $x_{sample} = [x_{\lambda 1}, x_{\lambda 2}, \ldots, x_{\lambda n}]$
$y_{sample} = [y_{C1}, y_{C2}, y_{C3}, y_{C4}, y_{C5}, y_{C6+}, y_{CO2}]$
$B = [b_{C1}, b_{C2}, b_{C3}, b_{C4}, b_{C5}, b_{C6+}, b_{CO2}]$ B is a mapping matrix calibrated against optical spectra of reservoir fluids in a database. In the presence of scattering due to fouling of the windows, predictions would be potentially biased:

$y_{sample} + y_{scattering} = (x_{sample} + x_{scattering}) B$ (20)

Moreover, prediction uncertainty of component, i, ($\delta y^i_{scattering}$) arising from $\delta x_{scattering}$ in eq. (16) is approximately described as follows:

$(\delta y_{scattering}^i)^2 \approx \text{var}(y_{scattering}) = b_{i_i}^T \text{cov}(\delta x_{scattering}) b_{i_i}$ (21)

(i∈C1~C6+ and CO2)

Similarly, predictions, and uncertainties derived from for $x_{drift}$ can be described:

$y_{sample} + y_{drift} = (x_{sample} + x_{drift}) B$ (22)

$(\delta y_{drift}^i)^2 \approx \text{var}(y_{drift}) = b_{i_i}^T \text{cov}(\delta x_{drift}) b_{i_i}$ (23)

Composition in weight fraction and uncertainties may then be computed from the predicted concentrations. Further, GOR can be estimated from the composition, followed by computing GOR uncertainty from the uncertainties of the composition.

Figure 12:
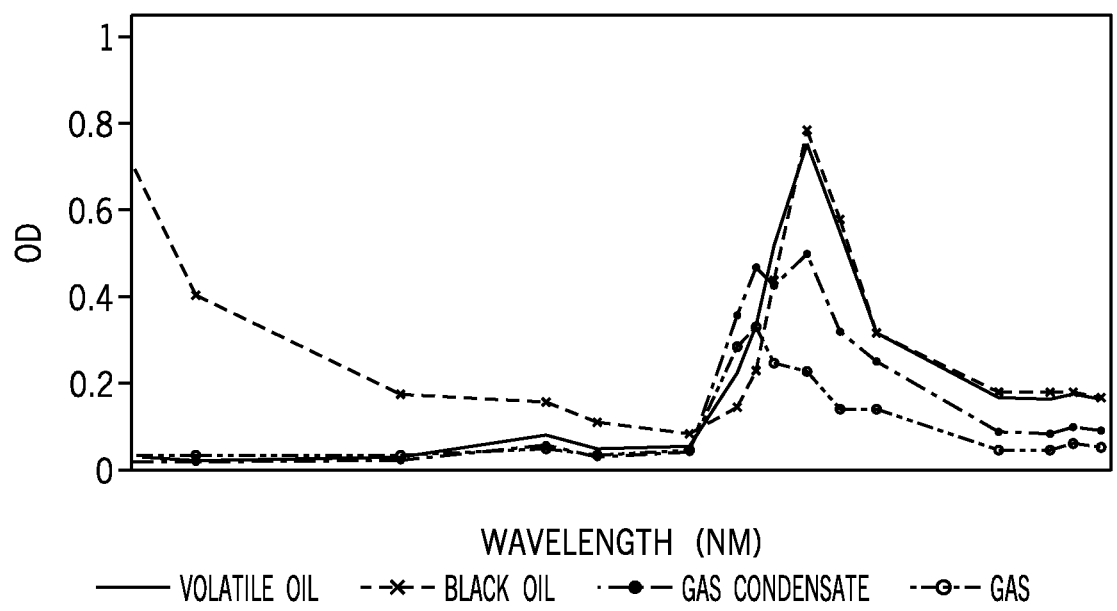
FIG. 12 graphically depicts representative optical spectra of certain reservoir fluids that can be stored in a database and used for comparison with data from the spectrometer to diagnose the condition of the spectrometer in accordance with one embodiment.
Figure 13:
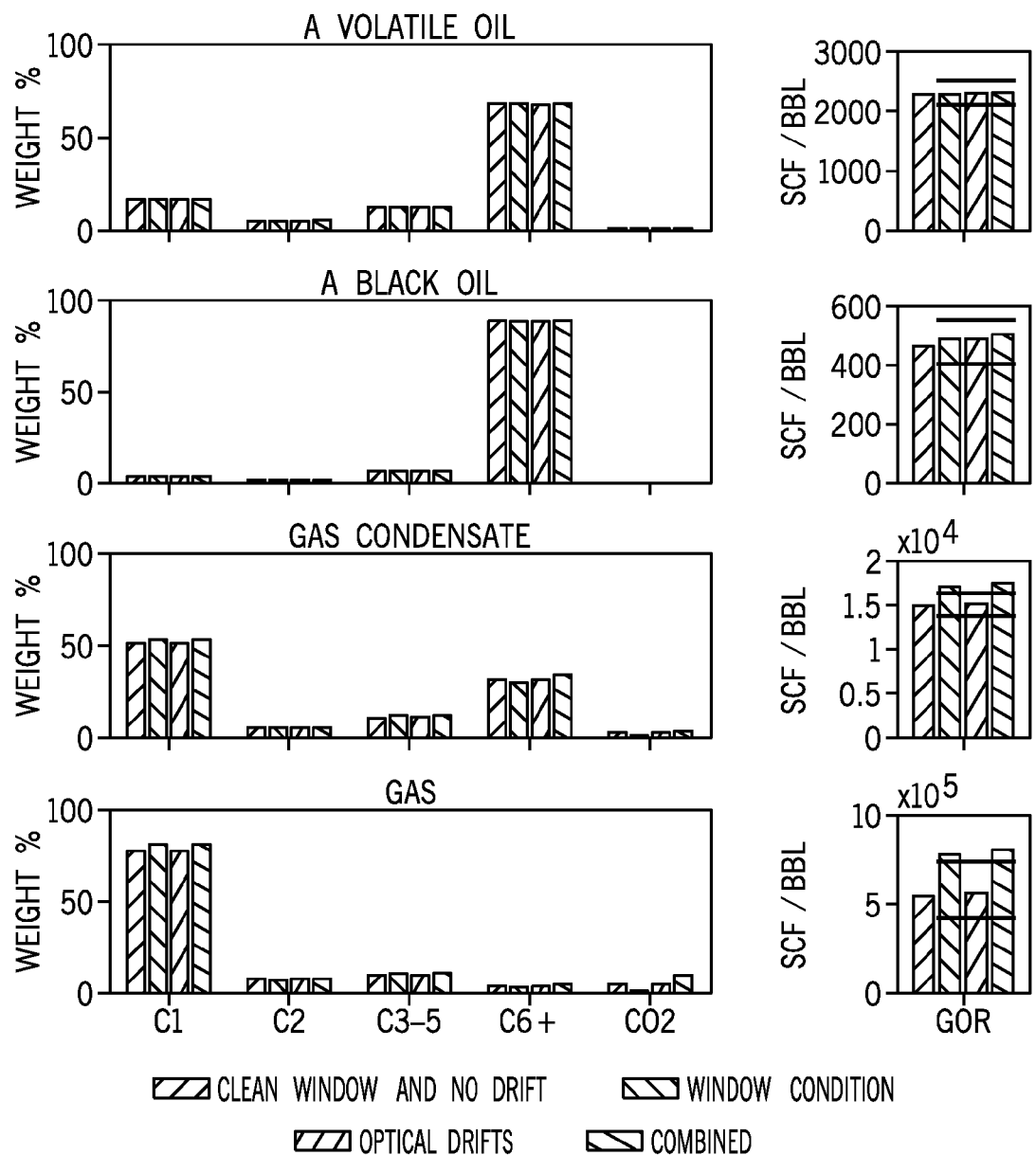
FIGS. 13 and 14 depict examples of estimated fluid composition and gas-oil ratios for certain reservoir fluids, and the estimated impacts of scattering and optical drifts on the estimated fluid composition and gas-oil ratios, in accordance with certain embodiments.

FIG. 12 shows representative optical spectra of some typical reservoir fluids, including volatile oil, black oil, gas condensate, and gas, in an optical spectral database. Composition and GOR are estimated for those optical spectra in the database, which can be measured in an ideal condition that assumes no fouling on optical windows and no optical drift. Additionally, these properties are computed for the spectra with virtually added scattering and optical drifts, as well as the results with the total baseline drifts, as indicated in FIG. 13. Criteria (e.g., thresholds) can be set on GOR in comparison with the database samples to facilitate decision making as to whether servicing (e.g., recalibration, compensation, or physical window cleaning) should be performed. In at least one embodiment, the criteria are defined based on potential variability between spectrometer units arising from optical filter specifications. In other words, even though no fouling and no optical drifts are present, estimated GORs may vary depending on the spectrometer unit. It is noted that the GOR criterion for the gas sample may be relatively wide compared to the other fluid types because GOR for gas is extremely sensitive to the composition error and, in particular, to the C6+ error resulting from wavelength tolerance.

Figure 14:
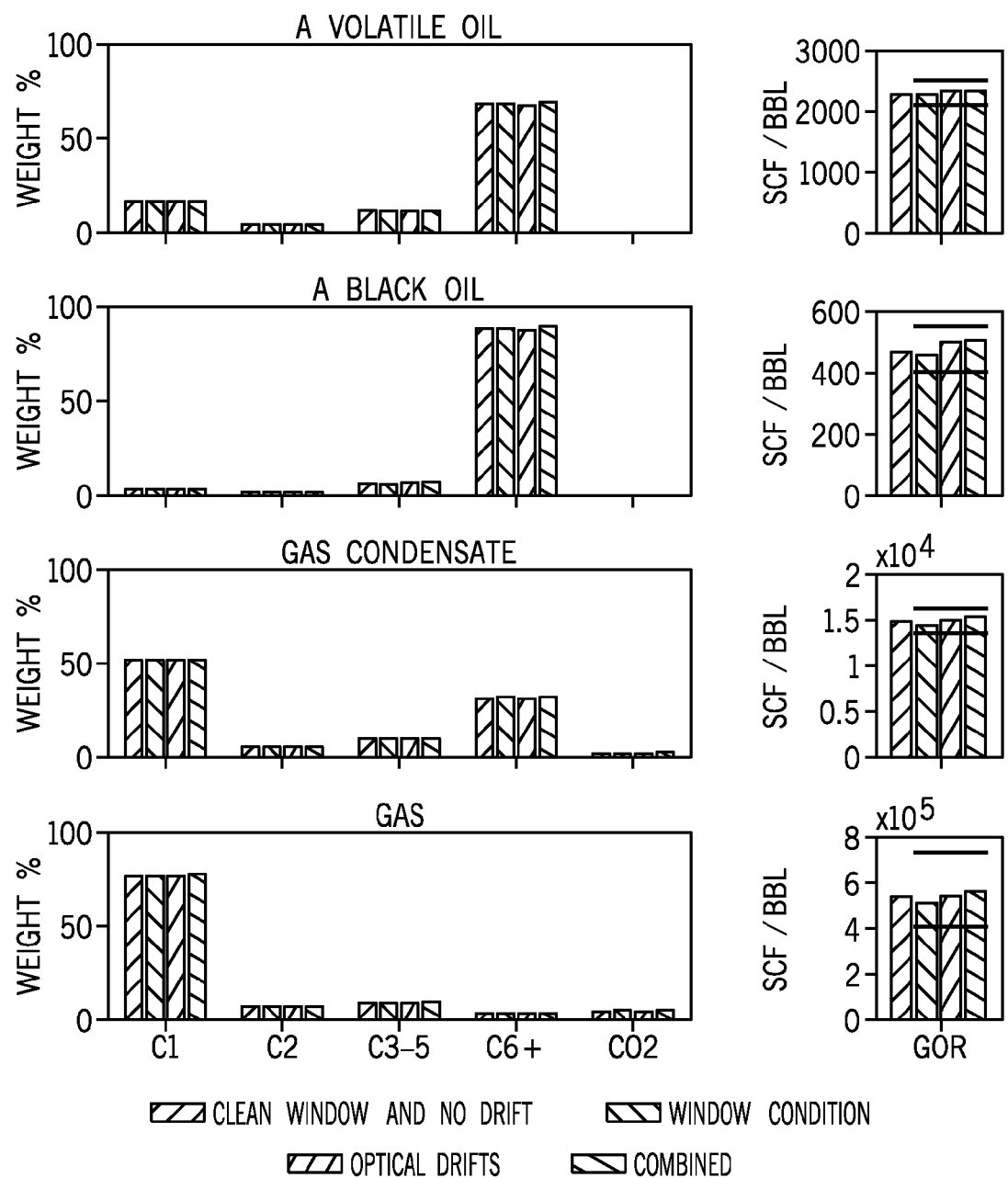

If the estimated GOR, including the uncertainty impacted by scattering and optical drifts, are within the criteria on each of the representative samples, no window cleaning and no recalibration are called for. In the example in FIG. 13, the GOR of volatile and black oil results are each within the criteria (indicated by horizontal bars across the depicted GOR graphs), while those of gas condensate and gas impacted by scattering (from a fouled "window condition") are outside of the criteria. Impacts from optical drifts, however, are still within the criteria, meaning that no recalibration is called for, although additional flowline cleaning may be helpful since impacts of scattering are above a desired threshold. FIG. 14 shows results of a different case. Each of the GOR results is within the criteria in this case (which are also indicated by the horizontal bars across the depicted GOR graphs in FIG. 14), and no additional cleaning and baseline calibration are called for.

Figure 16:
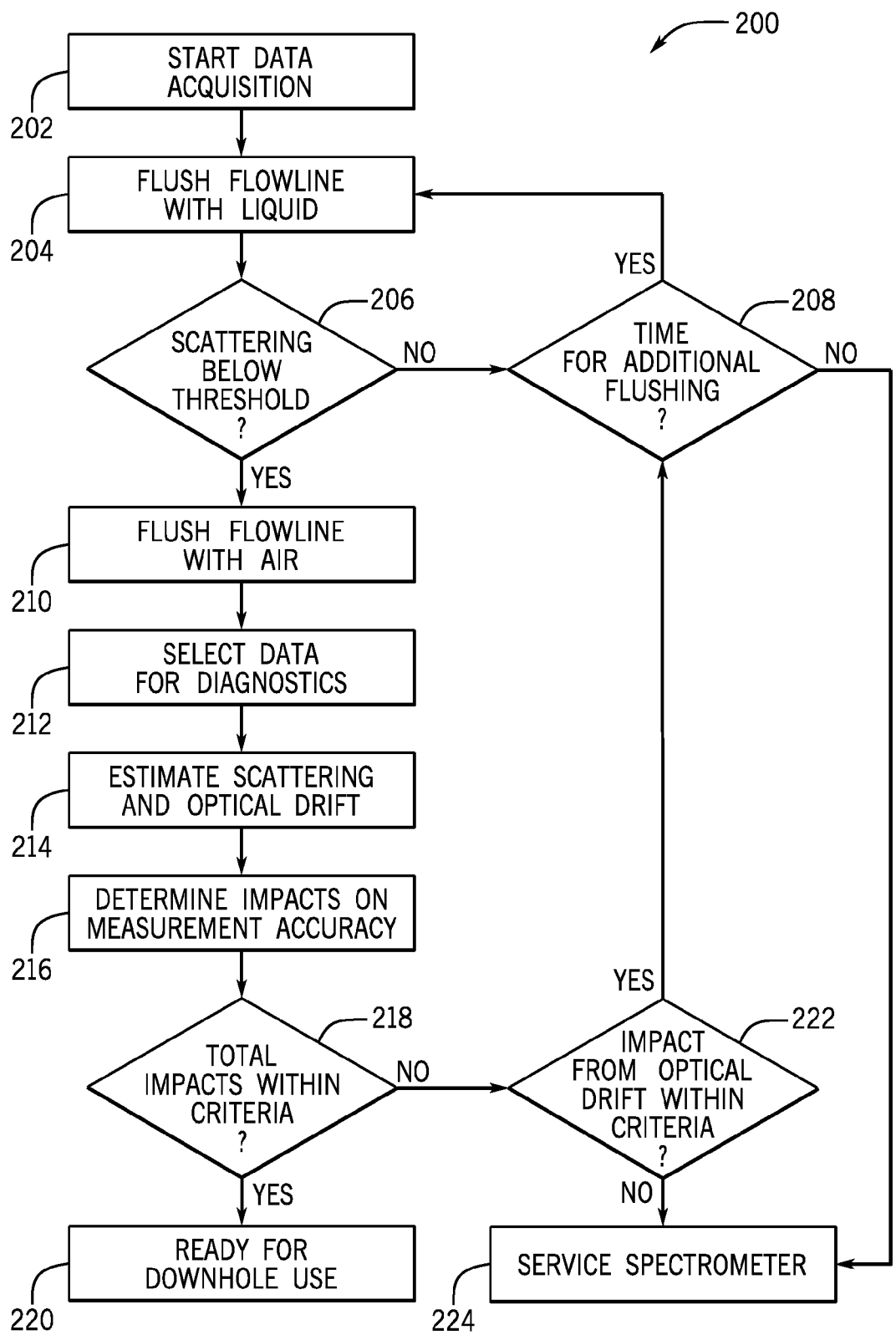
FIG. 16 is a flowchart for diagnosing the condition of a downhole tool spectrometer of a downhole tool by estimating scattering and optical drift for the spectrometer in accordance with one embodiment.

Another example of a process for diagnosing the condition of a spectrometer is generally represented by flowchart 200 in FIG. 16. In at least some instances, this process can be used for baseline diagnosis of an optical spectrometer at a wellsite after downhole operation. Optical data can be acquired with the spectrometer (block 202) while flushing the flowline (block 204) with a cleaning fluid for a defined period of time (e.g., twenty minutes) or until the fluid passing out of the flowline becomes clear (in the case of colorless cleaning fluids, which help differentiate the cleaning fluid from contaminants in the flowline). In at least some embodiments, the cleaning agent is a liquid cleaning agent, such as clear water, ethanol, toluene, or some other liquid solvent.

During and after flowing cleaning fluid, the optical window condition (scattering) could be monitored using spectrometer channels allocated to the color region. To monitor scattering by large particles (geometric scattering) and small particles (wavelength-dependent scattering), an OD difference between two different channels in the color or near-color regions could be used. The criterion for preliminarily checking scattering level at this stage may be an OD difference between two different channels in color or near-color channels, where the cleaning fluid has less absorbance. In one example, the criterion for water utilized can be:

$$(OD(1070\ nm) < 0.1) \cap (OD(680\ nm) - OD(815\ nm) < 0.02) \quad (24)$$

Figure 15:
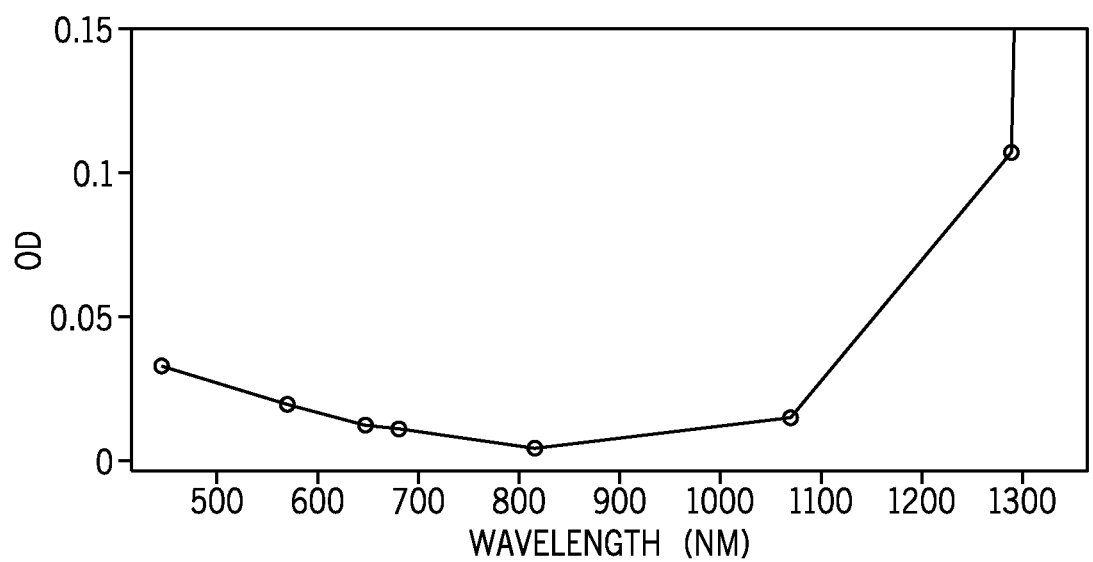
FIG. 15 is an example of an optical spectrum for water circulated through a flowline of a spectrometer for cleaning in accordance with one embodiment.

FIG. 15 depicts an example of an optical spectrum for water circulated through the flowline of the spectrometer during cleaning. If the measured optical density does not meet this criterion (block 206), and there is sufficient time for further cleaning at the wellsite (block 208), the flushing of the flowline with the liquid or other cleaning fluid may continue for an additional period of time or until scattering falls below a desired threshold. After cleaning the flowline by flushing it with water (or another solvent), the flowline can be dried by flushing the water out with dry air (block 210) for a period of time (e.g., ten minutes).

A data set can then be selected for diagnostics (block 212). In at least some instances, this can include selecting the data set having the lowest h value during blowing the flowline dry with air, as described above. Scattering and optical drift can then be estimated for the spectrometer (block 214) and impacts of the scattering and optical drifts on measurement accuracy for the answer products can be determined (block 216), such as also described above. If the total impacts fall within desired criteria (block 218), the method can include indicating to a user that the spectrometer is ready for further use (block 220) without recalibration or other servicing. If the total impacts fall outside the desired criteria, but the impact from the optical drift (not considering the impact from scattering) falls within desired criteria (block 222) and additional time is available for further flushing of the flowline with a cleaning fluid (block 208), additional flushing of the flowline could be performed to try and reduce scattering. If the impact from the optical drift itself falls outside the desired criteria, or if there is insufficient time for additional flushing, an indication that servicing should be performed (block 224) can be given to an operator. The servicing could include one or more of disassembly and physical cleaning of the optical windows, recalibration at the wellsite, or recalibration at a maintenance location away from the wellsite. Indications to the user about the condition of the spectrometer and whether the spectrometer should be serviced or is ready for further use can be provided in any suitable manner, such as through visual indications (via a display or indicator light). Further, it will be appreciated that at least some aspects of the techniques described herein can be performed by any suitable processor-based system, such as the controller 100 within a downhole tool, the monitoring system 56 or 66, or some other system. For instance, the acts of selection, estimation, and determination in blocks 212, 214, and 216 could be performed by the controller 100 in a downhole tool or by some other processor-based system. Such systems can use any suitable algorithms, executable code, lookup tables, or the like to carry out the functionality described above.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method comprising:
cleaning a flowline of a spectrometer of a downhole tool including flushing the flowline with a fluid;
acquiring optical data from the spectrometer during the cleaning of the flowline;
selecting a data set from the optical data acquired during the flowline cleaning;
estimating light scattering and optical drift for the spectrometer based on the selected data set; and
determining impacts of the estimated light scattering and optical drift for the spectrometer on measurement accuracy of a characteristic of a downhole fluid determinable through analysis of the downhole fluid using the spectrometer.

2. The method of claim 1, comprising diagnosing a condition of the spectrometer based on the determined impacts of the estimated light scattering and optical drift for the spectrometer on measurement accuracy of the characteristic of the downhole fluid.

3. The method of claim 2, wherein diagnosing the condition of the spectrometer includes determining whether the spectrometer is ready for downhole use based on the impacts of the estimated light scattering for the spectrometer on measurement accuracy of a characteristic of a downhole fluid.

4. The method of claim 2, wherein diagnosing the condition of the spectrometer includes determining whether the determined impacts of the estimated light scattering and optical drift for the spectrometer on measurement accuracy of the characteristic of the downhole fluid fall within desired criteria, and wherein diagnosing the condition of the spectrometer includes determining whether the determined impact of the estimated light scattering for the spectrometer on measurement accuracy of the characteristic of the downhole fluid falls within the desired criteria.

5. The method of claim 4, comprising:
determining that the determined impact of the optical drift for the spectrometer on measurement accuracy of the characteristic of the downhole fluid falls within the desired criteria;
determining that the determined impact of the estimated light scattering for the spectrometer on measurement accuracy of the characteristic of the downhole fluid does not fall within the desired criteria; and
cleaning the flowline of the spectrometer of the downhole tool in response to both determining that the determined impact of the optical drift falls within the desired criteria and determining that the determined impact of the estimated light scattering does not fall within the desired criteria.

6. The method of claim 2, wherein acquiring optical data from the spectrometer, selecting the data set, estimating light scattering and optical drift for the spectrometer, and determining impacts of the estimated light scattering and optical drift for the spectrometer are performed after downhole operation of the downhole tool, wherein diagnosing the condition of the spectrometer includes determining whether the determined impacts of the estimated light scattering and optical drift for the spectrometer on measurement accuracy of the characteristic of the downhole fluid fall within desired criteria, wherein the desired criteria includes a first threshold for the downhole fluid and a second threshold for the downhole fluid, and wherein the first threshold and the second threshold are different.

7. The method of claim 2, wherein diagnosing the condition of the spectrometer includes determining whether the determined impacts of the estimated light scattering and optical drift for the spectrometer on measurement accuracy of the characteristic of the downhole fluid fall within desired criteria, wherein the desired criteria includes a first threshold for a first typical reservoir fluid and a second threshold for a second typical reservoir fluid, and wherein the first threshold and the second threshold are different, and wherein the first typical reservoir fluid is different from the second typical reservoir fluid.

8. The method of claim 1, wherein determining impacts of the estimated light scattering and optical drift for the spectrometer on measurement accuracy of the characteristic of the downhole fluid includes determining impacts of the estimated light scattering and optical drift for the spectrometer on measurement accuracy of a gas-oil ratio of the downhole fluid.

9. The method of claim 1, wherein the cleaning of the flowline comprises flushing the flowline with a liquid solvent and then with a gas.

10. The method of claim 9, wherein selecting the data set from the optical data acquired during cleaning of the flowline includes selecting the data set from the optical data acquired after flushing of the flowline with the liquid solvent.

11. The method of claim 10, wherein selecting the data set from the optical data acquired during flushing of the flowline includes selecting the data set from the optical data acquired during flushing of the flowline with the gas.

12. A method comprising:
quantifying optical drift of an optical spectrometer of a downhole tool, wherein quantifying optical drift of the optical spectrometer includes quantifying optical drift of the optical spectrometer due to physical change in the optical spectrometer;
quantifying light scattering of the optical spectrometer of the downhole tool, wherein quantifying the light scattering of the optical spectrometer includes quantifying the light scattering of the optical spectrometer due to window fouling of the optical spectrometer;
quantifying baseline drift of an optical spectrometer of a downhole tool, wherein quantifying baseline drift of the optical spectrometer includes quantifying baseline drift of the optical spectrometer due to window fouling and due to physical change in the optical spectrometer;
estimating impact of the baseline drift of the optical spectrometer on prospective measurement of a fluid property that would rely on data acquired by the optical spectrometer; and
estimating impact of the light scattering of the optical spectrometer on prospective measurement of a fluid property that would rely on data acquired by the optical spectrometer;
determining whether the estimated impact of the baseline drift of the optical spectrometer on the prospective measurement of the fluid property is greater than a desired threshold; and
determining whether the estimated impact of the light scattering of the optical spectrometer on the prospective measurement of the fluid property is greater than the desired threshold.

13. The method of claim 12, comprising flushing with a cleaning fluid the flowline of the spectrometer of the downhole tool in response to determining that the determined impact of the light scattering does not fall within the desired criteria.

14. The method of claim 12, comprising recalibrating the optical spectrometer in response to determining that the estimated impact of the baseline drift of the optical spectrometer on the prospective measurement of the fluid property is greater than the desired threshold.

15. The method of claim 12, comprising disassembling the optical spectrometer and cleaning windows of the disassembled optical spectrometer in response to determining that the estimated impact of the light scattering of the optical spectrometer on the prospective measurement of the fluid property is greater than the desired threshold.

16. The method of claim 12, wherein quantifying baseline drift of the optical spectrometer includes quantifying baseline drift of the optical spectrometer during flushing of a flowline of the optical spectrometer with a fluid.

17. The method of claim 12, wherein the property fluid is for a volatile oil, black oil, gas condensate, or gas formation fluid.

18. An apparatus comprising:
a downhole sampling tool including:
a flowline;
an intake configured to receive a fluid within the flowline; and
a spectrometer positioned to facilitate acquisition of optical data for the fluid in the flowline; and
a controller operable to assess baseline drift of the spectrometer and to estimate quantitative impact of the baseline drift on a future calculation of a characteristic of interest of the fluid based on optical data from the spectrometer, wherein the controller is operable to determine whether the spectrometer should be serviced before downhole use and to output to a user an indication of whether the spectrometer should be serviced, and is operable to determine whether the estimated impact of the light scattering of the optical spectrometer on the prospective measurement of the fluid property is greater than the desired threshold.

19. The apparatus of claim 18, wherein the controller is operable to quantify light scattering of the optical spectrometer of the downhole tool, wherein quantifying the light scattering of the optical spectrometer includes quantifying the light scattering of the optical spectrometer due to window fouling of the optical spectrometer, and estimate impact of the light scattering of the optical spectrometer on prospective measurement of a fluid property that would rely on data acquired by the optical spectrometer.

20. The apparatus of claim 19, wherein at least a portion of the controller is provided within the downhole sampling tool.

\* \* \* \* \*